UNITED STATES PATENT OFFICE.

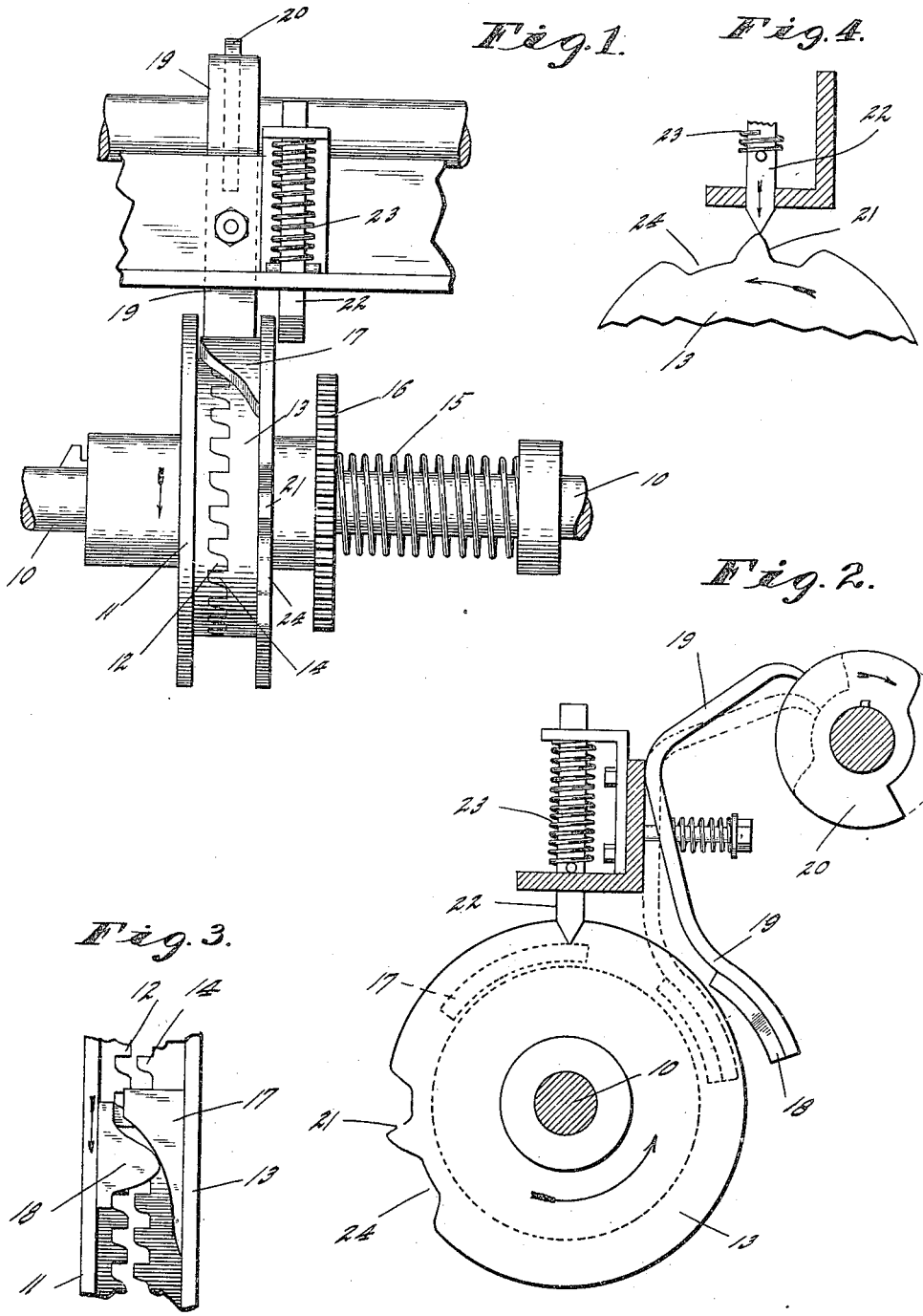

HARRY A. HANCOCK, OF INDIANAPOLIS, INDIANA, ASSIGNOR TO THE BROWN STRAW BINDER COMPANY, OF INDIANAPOLIS, INDIANA, A CORPORATION OF INDIANA.

CLUTCH.

962,567.      Specification of Letters Patent.      Patented June 28, 1910.

Application filed September 27, 1909. Serial No. 519,759.

*To all whom it may concern:*

Be it known that I, HARRY A. HANCOCK, a citizen of the United States, residing at Indianapolis, in the county of Marion and State of Indiana, have invented certain new and useful Improvements in Clutches, of which the following is a specification.

The object of my invention is to provide a clutch mechanism with means for positively insuring a proper disconnection of the clutch members.

The accompanying drawings illustrate my invention.

Figure 1 is a side elevation of a clutch constructed in accordance with my invention; Fig. 2 an end elevation in partial section; Fig. 3 a fragmentary detail showing the coaction between the stationary separator and the separating cam and Fig. 4 a detail of the means for producing the necessary additional final movement of the separated clutch member.

In the drawings 10 indicates a shaft to which is keyed a clutch member 11 provided with the usual clutching teeth 12. Journaled upon shaft 10 is the mating clutch member 13 provided with the usual clutch teeth 14 adapted to mesh with teeth 12. Clutch member 13 is normally urged toward clutching position by means of a spring 15 and is provided with a suitable gear or other member 16 to receive or transmit power. Secured to member 13 is a separating cam 17 adapted to coöperate with a movable cam 18 carried by an arm 19 and movable into or out of the path of movement of the cam 17 in any ordinary manner. In the present drawings I have shown a cam 20 for automatically accomplishing the movement of cam 18. Thus far the structure is substantially identical with clutch mechanisms ordinarily in use but in practice it is found that, when cam 18 is thrown down into the path of movement of cam 17, the only thing which causes an axial movement of the clutch member 13 relative to clutch member 11 is the driving force which is transmitted from the teeth 12 to the teeth 14 and, just at the point of separation there is a tendency for the clutch member 13 to lag and not produce a sufficient axial movement of the clutch member 13 to insure separation of the teeth. Consequently a clutch member of this type is very apt, after some time, to have the driving corners of its teeth broken off.

In order to overcome this difficulty, therefore, I provide member 13 with an inclined shoulder 21 adapted to be engaged by spring plunger 22 normally urged in the direction indicated by the arrow in Fig. 4 by means of a spring 23. Shoulder 21 is brought to the position indicated in Fig. 4 just as cams 17 and 18 have produced an axial movement of the clutch member 13 almost to the point of separation of the teeth 12 and 14, so that the force of spring 23 comes into play to produce a further rotation of member 13 independent of the driving force which has theretofore been exerted by teeth 12, thus causing a further movement of cam 17 on cam 18 and a consequent further separation of teeth 14 from teeth 12. In the form shown in the drawings cam shoulder 21 normally has a path of movement out of the line of plunger 22 in order that the driven member 13 of the clutch may be given as many rotations as may be desired and therefore, in order to permit shoulder 21 to be brought into alinement with plunger 22, by reason of the interaction of cam 17 and the abutment 18, I provide, in front of cam shoulder 21, a notch 24.

I claim as my invention:

1. The combination, with a pair of rotatable interengaging clutch members, a separating cam carried by one of said members, and an abutment movable into and out of the line of movement of said separating cam, of independent means for engaging the cam carrying clutch member and partially rotating the same at about the time of separation of the interengaging portions of the clutch members.

2. The combination, with a pair of rotatable interengaging clutch members, a separating cam carried by one of said members, and an abutment movable into and out of the line of movement of said separating cam, of a spring plunger, and a cam shoulder carried by the driven clutch member in position to be engaged by said spring plunger to partially rotate the driven clutch member.

In witness whereof, I have hereunto set my hand and seal at Indianapolis, Indiana, this second day of August, A. D. one thousand nine hundred and nine.

HARRY A. HANCOCK. [L. S.]

Witnesses:
    ARTHUR M. HOOD,
    THOMAS W. MCMEANS.